United States Patent [19]

Potember et al.

[11] Patent Number: 4,957,725

[45] Date of Patent: Sep. 18, 1990

[54] VANADIUM DIOXIDE FORMED BY THE SOL-GEL PROCESS

[75] Inventors: Richard S. Potember, Catonsville; Kenneth R. Speck, Baltimore; Henry S. Hu, Derwood, all of Md.

[73] Assignee: The Johns Hopkins University, Baltimore, Md.

[21] Appl. No.: 215,107

[22] Filed: Jul. 5, 1988

[51] Int. Cl.$^5$ ............................................. C01G 31/00
[52] U.S. Cl. .................................. 423/592; 106/1.05; 106/286.1; 427/383.7; 437/228; 501/12
[58] Field of Search ...................... 423/592; 427/430.1, 427/383.7; 106/1.05, 286.1; 501/12; 437/228

[56] References Cited

U.S. PATENT DOCUMENTS 4,732,879  3/1988  Kalinowski et al. ................. 502/202
4,798,710  1/1989  Legrand .............................. 423/592

FOREIGN PATENT DOCUMENTS 1097555  6/1984  U.S.S.R. .............................. 423/592

OTHER PUBLICATIONS

Greenberg, Charles B., "Undoped and Doped VO$_2$ Films Grown from VO (OC$_3$H$_7$)$_3$", *Thin Solid Films*, vol. 110 (1983), pp. 73-82.

Arfsten, N. J., "Sol-Gel Derived Transparent IR-Reflecting ITO Semiconductor Coatings and Future Applications", vol. 63, 1984, pp. 243-249.

Schott et al., "Amorphous and Crystalline Dip Coatings Obtained from Orgnometallic Solutions: Procedures, Chemical Processes and Products", *Thin Solid Films*, vol. 77 (1981), pp. 129-139.

Bradley, D. C. and Mehta, M. L., "Alkoxides of Vanadium (IV)", *Canadian Journal of Chemistry*, vol. 40, (1962), pp. 1183-1188.

*Primary Examiner*—Robert L. Stoll
*Attorney, Agent, or Firm*—Robert E. Archibald; Mary Louise Beall

[57] ABSTRACT

Vanadium dioxide thin films have been prepared from tetrravalent vanadium organic compounds via the sol gel process. The vanadium dioxide was deposited from an alcoholic solution. Films were annealed between 200°-700° C. under nitrogen to achieve complete dehydration and crystallization.

26 Claims, 4 Drawing Sheets

PREPARATION OF VO$_2$ ALLOYS BY THE SOL GEL METHOD

TEMPERATURE DEPENDENCE OF OPTICAL TRANSMISSION AT 2400 NM. (NEAR-IR TRANSMITTANCE)

TEMPERATURE DEPENDENCE OF ELECTRICAL RESISTANCE

SPECTRAL TRANSMISSION OF $VO_2$ ABOVE AND BELOW ITS TRANSITION TEMPERATURE

TEMPERATURE DEPENDENCE OF ELECTRICAL RESISTANCE OF $VO_2$ AT 2400 nm

TEMPERATURE DEPENDENCE OF OPTICAL TRANSMISSION OF $VO_2$ AT 2400 nm

TEMPERATURE DEPENDENCE OF OPTICAL TRANSMISSION AT 2400 nm FOR $V_{0.98}Mo_{0.02}O_2$

TEMPERATURE DEPENDENCE OF OPTICAL TRANSMISSION AT 2400 nm FOR $V_{0.99}W_{0.01}O_2$

SPECTRAL TRANSMITTANCE OF $V_{0.98}Mo_{0.02}O_2$ ABOVE AND BELOW ITS TRANSITION TEMPERATURE

SPECTRAL TRANSMISSION OF $V_{0.99}W_{0.01}O_2$ ABOVE AND BELOW ITS TRANSITION TEMPERATURE

VANADIUM DIOXIDE FORMED BY THE SOL-GEL PROCESS

STATEMENT OF GOVERNMENTAL INTEREST

The invention herein described was made under grant No. AFOSR-85-0169 provided by the U.S. Air Force.

BACKGROUND OF THE INVENTION

The present invention pertains generally to a sol-gel process for preparing vanadium dioxide. In particular, this process is useful for the preparation of vanadium dioxide thin films.

Traditionally, vanadium dioxide thin films have been prepared either by vacuum deposition or chemical vapor deposition techniques. A gelation-hydrolysis process followed by post-reduction has been used to grow vanadium dioxide thin films from vanadium (V) oxy-triisopropoxide as described in "Undoped and Doped $VO_2$ Films Grown from $VO(OC_3H_7)_3$", *Thin Solid Films*, by C. B. Greenberg, Vol. 110 (1983) page 73. However, thin films of vanadium dioxide are not easily prepared by these techniques and precise control of deposition parameters is needed to maintain the proper chemical composition. Moreover, post-reduction of high oxide films is difficult to control and tends to leave films inhomogeneous and porous.

A dip coating process for fabricating thin indium-tin oxide films by a sol-gel method is the subject of "Sol-Gel Derived Transparent IR-Reflecting ITO Semiconductor Coatings and Future Applications", by N. J. Arfsten, *Journal of Non-Crystalline Solids*, Vol. 63 (1984) pages 243-249. However, no procedure for the for the actual preparation of and/or the identification of any starting materials is given.

Dip coatings are also the subject of "Amorphous and Crystalline Dip Coatings Obtained From Organometallic Solutions: Procedures, Chemical Processes and Products", by Helmuth Dislich and Eckart Hussmann, *Thin Solid films*, Vol. 77 (1981) pages 129-139. While the basic process is broadly described, there is no teaching for the preparation of vanadium dioxide.

U.S. Pat. No. 2,180,353 relates to a process for the preparation of vanadium oxides using a pentavalent vanadium compound as a starting material. According to this process, the pentavalent compound is partially reduced by heating with hydrochloric acid to produce a compound containing vanadium in the tetravalent state. The resultant mixture is then treated with water, heated and ignited to produce a catalytic mixture of oxides (page 2, column 2, lines 19-35). The reduced compound is in the gelatinous state. Note that heating and boiling are required to obtain the gel (page 2, column 1, lines 32-39). Vanadium dioxide is not specifically mentioned.

U.S. Pat. No. 4,684,385 relates a sol gel process wherein a silicon alkoxide/water/alcohol solution is hydrolyzed to form a gel. The gel is then dried to form a glass body (column 1, lines 36-39).

The vanadium dioxide semiconductor to metal phase transition observed at 68° is known to be old in the art.

Other U.S. patents generally related to this technology are U.S. Pat. Nos. 1,941,557; 2,081,272; 3,759,683; 3,847,583; 4,524,051; and 4,539,309.

Thin films of stoichiometric vanadium dioxide are not easily prepared. In chemical vapor deposition and vacuum deposition processes, precise control of the deposition atmosphere is needed to maintain the proper chemical composition. In processes requiring post reduction of higher oxides, the films tend to be inhomogeneous and porous.

OBJECTS OF THE INVENTION

The object of the invention is to prepare vanadium dioxide using a simplified process not requiring precise control of the deposition atmosphere or post reduction of higher oxides.

An object of the present invention is a process for the preparation of vanadium dioxide using a sol gel method.

Another object is the deposition of films of vanadium dioxide by the sol gel method and in particular the deposition of thin films by dip coating.

It is also an object of the present invention to prepare vanadium dioxide by the sol gel process using a tetravalent vanadium compound as a starting material.

SUMMARY OF THE INVENTION

According to the invention, vanadium dioxide is prepared from a tetravalent vanadium compound using a sol-gel process. The tetravalent compound is dissolved in a solvent and is hydrolyzed and condensed to progressively form a sol, while giving off alcohol and water. As the solvent evaporates, a gel forms which is then dehydrated to form vanadium dioxide.

If a thin film is desired, an appropriate substrate is dipped into the sol. The gel forms on the substrate as it is withdrawn from the sol. The dipping process is particularly useful for the coating of large surfaces such as windows, walls and wind screens, including windshields, with a thin film of vanadium dioxide.

DESCRIPTION OF THE PREFERRED EMBODIMENTS

Figure 2:
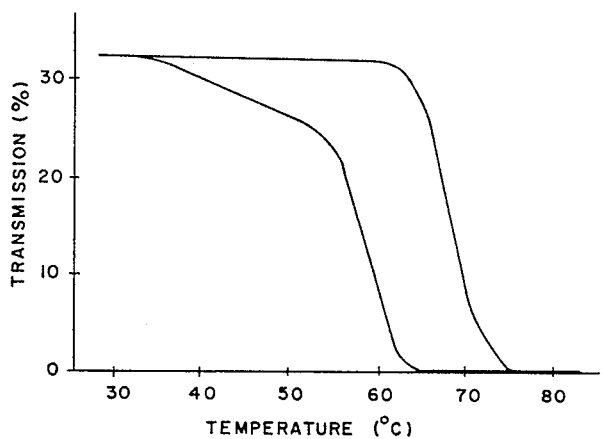
FIG. 2 is a graph representing the relationship between temperature and the percent of light transmitted through a glass slide having a 1500 Å film of vanadium dioxide deposited on each side of the slide.
Figure 3:
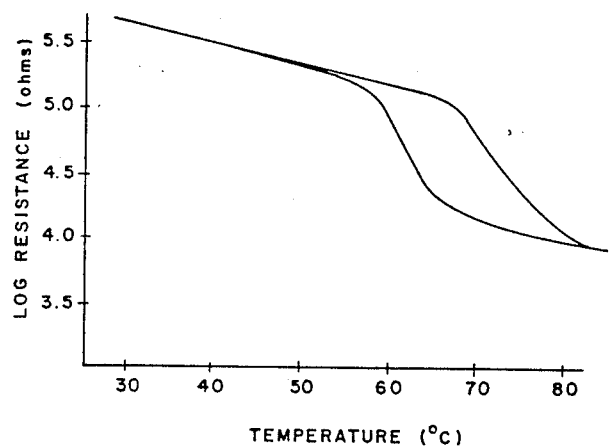
FIG. 3 is a graph representing the temperature dependence of the electrical resistance in a 1500 Å film of vanadium dioxide.

Monoclinic vanadium dioxide is known to undergo a reversible thermally induced semiconductor-to-metal phase transition at 68° C. Associated with this transition, the material exhibits large changes in its optical characteristics as shown in FIG. 2. Furthermore, there are reversible thermally induced electrical characteristics as shown in FIG. 3. Changes in magnetic characteristics are also noted. Because the optical properties change appreciably in the visible and near-infrared range of the spectrum, vanadium dioxide films are useful as energy conserving coatings for windows and walls.

Figure 1:
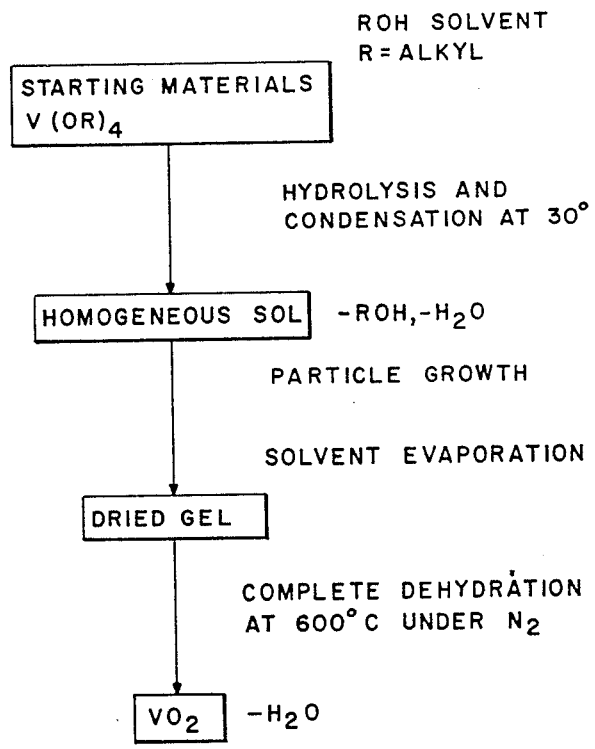
FIG. 1 is a flow diagram representing the process of the invention.

The process of the invention is summarized FIG. 1. A tetravalent vanadium compound such as vanadium (IV) tetraisopropoxide is dissolved in a solvent, in this case, isopropanol. An appropriate substrate, for example glass, is dipped into the alcohol solution and is withdrawn from the solution at a controlled rate, coating the substrate. Hydrolysis and condensation reactions begin in the solution and continue on the substrate as it is withdrawn, resulting in the formation of a sol on the substrate. Water and alcohol are given off. As the solvent evaporates, particle growth occurs and a gel is formed. A $V^{+4}$ oxidation state is maintained on the vanadium throughout hydrolysis and gelation of the tetravalent vanadium compound to minimize the appearance of other oxide phases in the final product. The resulting dried gel is completely dehydrated at between 200 and 700° C. under nitrogen to produce a vanadium dioxide film.

The vanadium dioxide coating may also be applied by a spray process or a spin-coating process. The final vanadium dioxide film is improved if the coating process occurs in an inert atmosphere, such as nitrogen, argon or helium, to prevent oxidation of the vanadium compound.

The overall reaction leading to vanadium dioxide formation is:

$$nV(OR)_4 + 2nH_2O \rightarrow (VO_2)_n + 4nROH$$

The starting material for this invention is a tetravalent vanadium organic compound, for example vanadium tetraalkoxide. The following vanadium tetralkoxides are useful:

Vanadium Tetraisopropoxide: $V(OCH(CH_3)_2)_4$

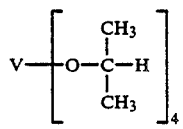

Vanadium Tetrabutoxide: $V(OC_4H_9)_4$

Vanadium Tetrakis(t-butoxide): $V(O(CH_3))_4$

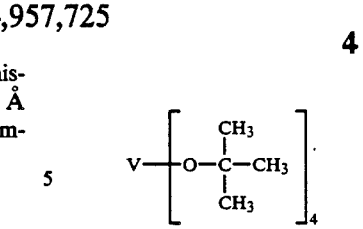

Vanadium Tetrakis(i-butoxide): $V(OCH_2CH(CH_3)_2)_4$

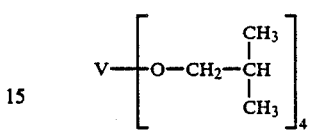

Vanadium Tetraamyloxide: $V(OC_5H_{11})_4$

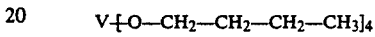

Note that both branched and straight chain tetralkoxides can be used. This type of starting material is easy to purify by standard chemical procedures which helps to improve the quality of the final product.

The tetravalent vanadium compound is synthesized according to the two step procedure of Bradley and Mehta "Alkoxides of Vanadium IV" (*Canadian Journal of Chemistry*, Vol. 40 (1962) page 1183):

$$VCl_4 + 4LiNEt_2 \rightarrow V(NEt_2)_4 + 4LiCl$$

$$V(NEt_2)_4 + 4ROH \rightarrow V(OR)_4 + 4Et_2NH$$

Both reactions are performed in a moisture-free nitrogen environment to prevent subsequent oxidation and hydrolysis which lead to an inferior final product. The diethyl ether is distilled from sodium benzophenone ketyl and the benzene is dried azeotropically. This method of preparation is suitable for vanadium tetraisopropoxide.

However, vanadium tetrakis(t-butoxide) can be prepared using the following one step procedure, for example:

This reaction was also performed at temperatures below 0° to control reaction rate and in a moisture-free nitrogen inert atmosphere to prevent subsequent oxidation and hydrolysis. The methylene chloride was dried over activated alumina, then distilled from calcium hydride prior to use. The atmosphere can be nitrogen argon or helium for example. The best results are obtained when the entire process is performed in an inert atmosphere. Vanadium tetrakis(t-butoxide) can be prepared from potassium, magnesium, lithium and sodium tert-butoxides.

A solution of vanadium tetrachloride (13.2 g) (Atomergic) dissolved in methylene chloride (50 ml) is added dropwise to a suspension of potassium tert-butoxide (50 g) (Aldrich) in methylene chloride (150 ml) while stirring at −78° C. The reaction mixture is warmed slowly to room temperature then filtered under nitrogen to give a green liquid. The methylene chloride is evaporated and vanadium tetrakis(t-butoxide), [V(Ot—Bu$_4$], (3 g) was collected as a blue liquid by vacuum distillation. Once collected, the product was stored in dry box.

According to the invention, the tetravalent vanadium compound is dissolved in a solvent, for example a polar solvent, which may be the parent alcohol to the vanadium organic compound. In particular, alcohols such isopropanol and t-butanol are useful.

DESCRIPTION OF A PREFERRED EMBODIMENT

A thin film of $VO_2$ is deposited by dipcoating a glass slide from a solution containing isopropanol. Corning 7059 barium borosilicate glass slides are first cleaned ultrasonically in a solution of MICRO and deionized water. The substrates are then rinsed with deionized water, blown dry with clean, dry air, and baked at 100° C. until used for dipcoating.

Approximately 100 mg of $V(Oi-Pr)_4$ is dissolved per 10 mL of isopropanol (Aldrich, HPLC Grade). The slides are dipped into the solution and then withdrawn from the solution at a controlled rate using a variable speed motor. A typical withdrawal rate as 1 mm/sec. Using this technique, both sides of the slide are coated. A yellow-green film immediately forms as each slide is withdrawn. Slides are coated more than once to build up the desired thickness of the film. Hydrolysis and condensation automatically begin in the solution and continue on the slide until the dried gel is formed. The films are then annealed between 400 and 700° C. for 10 minutes under nitrogen to achieve complete dehydration, removal of residual solvent, and crystallization. The $VO_2$ films produced are golden-brown color, evenly coated, and scratch-resistant.

The electrical and optical properties of samples prepared according to the process described above have been characterized when heated through the transition temperature. FIG. 2 shows the temperature dependence of optical transmission at 2400 nm, near infrared transmittance, for a glass slide provided on each side with a 1500 Å film. FIG. 3 shows the temperature dependence of the electrical resistance for the same film. Both of these figures show a distinct phase transition at approximately 68° C.

As shown in FIG. 3, electrical resistance decreases by one to two orders of magnitude at the 72° C. transition temperature. The phase transition occurs over a narrow range of temperatures, with a sharp heating-cooling hysteresis of about 10° C. The nearinfrared transmittance of the film, measured simultaneously with the resistance, is shown in FIG. 2. There is an abrupt decrease in transmission near 68° C. The usual hysteresis effect causes the transmission to begin increasing 10° C. lower when the sample is cooled.

Figure 4:
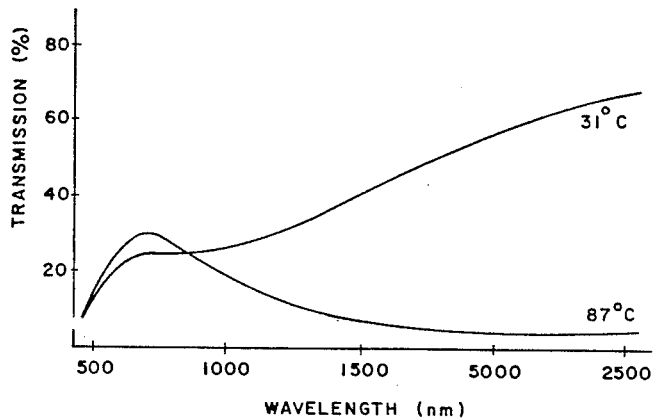
FIG. 4 is a graph representing the spectral transmission of a glass slide coated on each side with a 500 Å film of vanadium dioxide above and below its transition temperature.

FIG. 4 graphically represents the relationship between the amount of light transmitted through a glass slide provided on each side with 500 Å film of vanadium dioxide and the wave length of the light. Measurements were made two temperatures, one below of room temperature, and one above the transition temperature of the film and the transmission spectrum was scanned. The graph shows that, at near-infrared frequencies (2400 nm), less than 10% of the light is transmitted at 87° C. while almost 70% is transmitted at 31° C.

Figure 5:
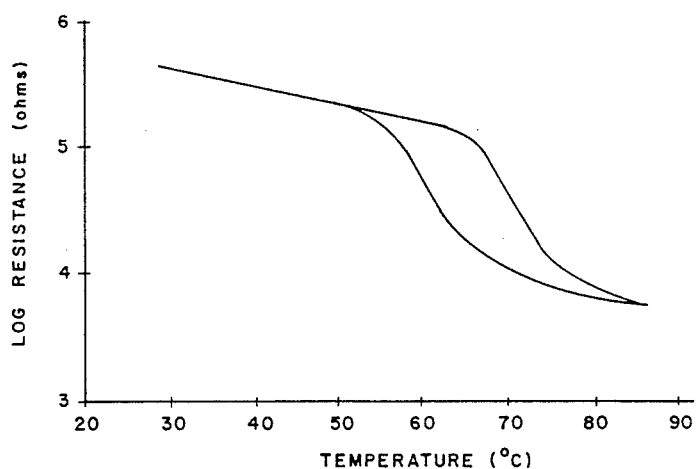
FIG. 5 is a graph representing the temperature dependence of the electrical resistance in a 250 Å film of vanadium dioxide.
Figure 6:
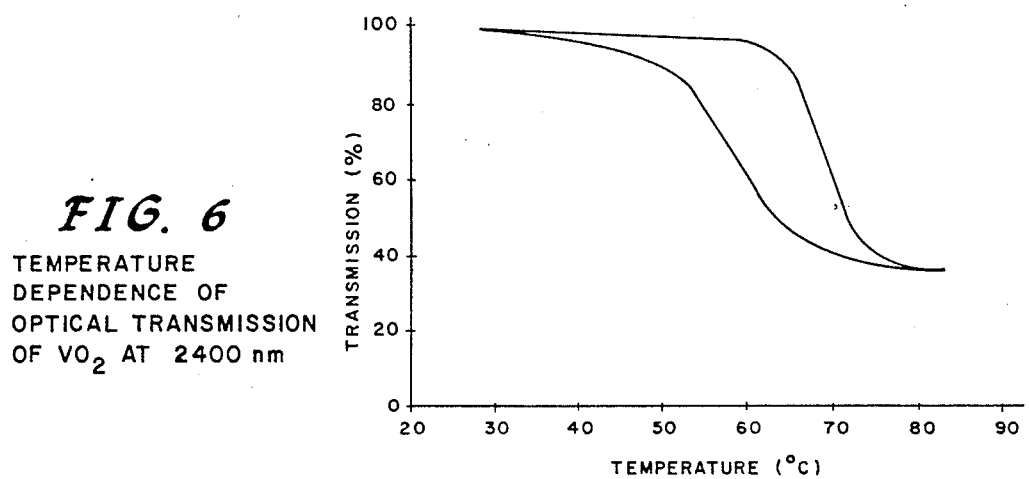
FIG. 6 is a graph representing the relationship between temperature and percent of light transmitted through a glass slide having a 250 Å film of $V_{0.98}Mo_{0.02}O_2$ deposited on each side of the slide.

Vanadium dioxide films deposited from vanadium tetrakis(t-butoxide) as described above have a reversible semiconductor-to-metal phase transition temperature near 72° C. as shown in FIGS. 5 and 6. FIG. 5 demonstrates the electrical switching behavior of a 250 Å thick vanadium dioxide film wherein electrical resistance decreases at by one to two orders of magnitude at the transition temperature. The transformation occurs over a narrow range of temperatures, with a sharp heating-cooling hysteresis of about 10° C. The near-infrared transmittance of the film at 2400 nm, measured simultaneously with resistance, is plotted in FIG. 6. As expected, there is an abrupt decrease in transmission near 68° C. The usual hysteresis effect causes the transmission to begin increasing 10° C. lower when the sample cooled.

Bulk vanadium dioxide can also be prepared by this process by eliminating the step of dipping a substrate into the solution of vanadium dioxide and alcohol. Instead, some additional water is added to the solution and hydrolysis and condenaation occur within the solution until the gel is formed which is then dehydrated and dried as described above.

The transition temperature of vanadium dioxide prepared according a sol gel process can be lowered by doping with hexavalent transition metal oxides such as those of tungsten, molybdenum and tantalum, with tungsten having the largest effect per atomic percent added. Iron and chromium raise the transition temperature with increase in atomic percent added. The dopant ions are placed into the crystal structure of the vanadium dioxide by combining an alcohol solution of the tetravalent vanadium compound with an alcohol solution of the metallic oxide and allowing the sol gel process to proceed. Metal oxychlorides, metal alkoxides, metal nitrates and metal oxalates can also be used. In particular, isopropanolic solutions of tungsten and/or molybdenum (IV) oxytetrachloride (Alpha) are recommended as are solutions of iron (III) nitrate and chromium (III) nitrate. The overall reaction for gel formation is:

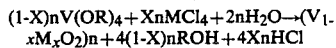

$$(1-X)nV(OR)_4 + XnMCl_4 + 2nH_2O \rightarrow (V_{1-x}M_xO_2)n + 4(1-X)nROH + 4XnHCl$$

where M=MoO or WO. Hydrolysis of the vanadium compound was catalyzed by HCL, the by-product. Deposition of the films occurred under nitrogen to prevent oxidation of the tetravalent vanadium compound. It is also necessary to heat the films under nitrogen to prevent oxidation of the film to vanadium pentoxide ($V_2O_5$). The molar ratio of metal ions in the film is assumed to be the same as the molar ration of metal ions in solution from which the films were grown.

Figure 7:
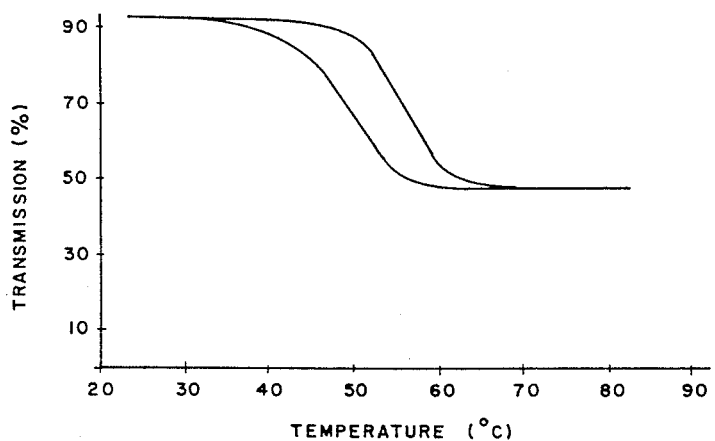
FIG. 7 is a graph representing the relationship between temperature and percent of light transmitted through a glass slide having a 500 Å film of vanadium dioxide deposited on each side of the slide.
Figure 8:
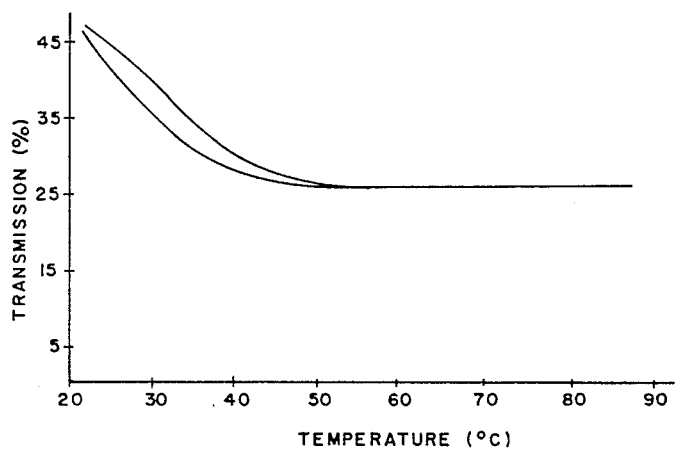
FIG. 8 is a graph representing the relationship between temperature and percent of light transmitted through a glass slide having a 500 Å film of $V_{0.99}W_{0.01}O_2$ deposited on each side of the slide.
Figure 9:
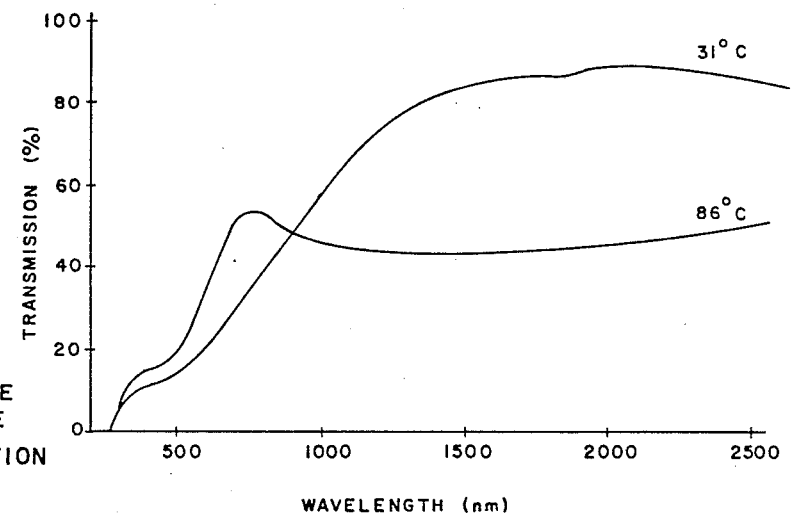
FIG. 9 is a graph representing the spectral transmission of a glass slide coated on each side with a 250 Å film of $V_{0.98}Mo_{0.02}O_2$ above an below its transition temperature.
Figure 10:
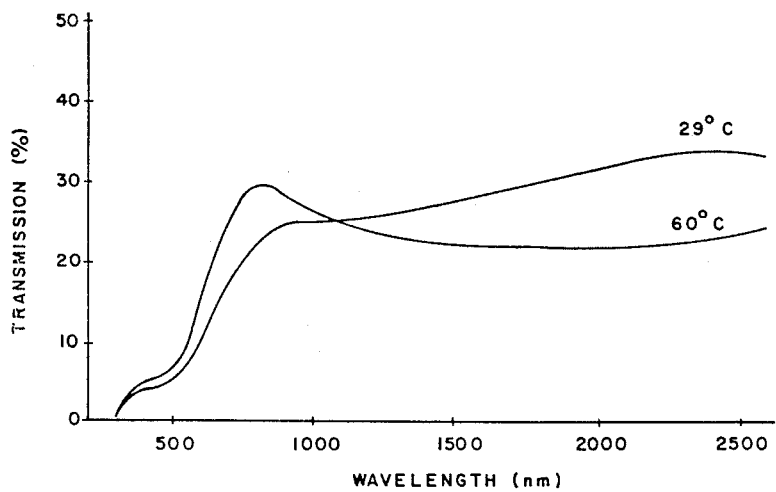
FIG. 10 is a graph representing the spectral transmission of a glass slide coated on each side with a 500 Å film of $V_{0.99}W_{0.01}O_2$ above and below its transition temperature.

FIG. 7, demonstrating the relationship between temperature and the amount of light transmitted through a glass slide provided on both sides with a 250 Å thick $V_{0.98}Mo_{0.02}O_2$ film, shows that the transition temperature has been reduced to nearly 56° C. FIG. 8, relating to a glass slide provided on both sides with a 500 Å thick $V_{0.99}W_{0.01}O_2$ film, shows that the transition temperature has been reduced to about 35° C. The spectral transmissions for the same two film-coated slides at temperatures both above and below the respective transition temperatures is shown in FIGS. 9 and 10 respectively. The vanadium dioxide films deposited according to the process of this invention undergo a reversible thermally-induced metal-to-semiconductor phase transition. Associated with this transition are non-linear optical, electrical and magnetic characteristics with respect to temperature. Vanadium dioxide is of special interest for both scientific investigation and for use in various technological applications because, at its transition temperature, its optical properties change appreciably in the visible and near-infrared range of the spectrum. There are many uses for vanadium dioxide. Of particular interest are erasable optical storage medium based on the phase transition and threshold switching devices based on Joule heating of the oxide when an external voltage is applied. Also, as noted above, vanadium dioxide has use as an energy conserving coating for windows and walls. Other applications include electro-chromic and photo-chromic devices, thermal sensors and transparent electrical conductors.

The invention described is not intended to be limited to the embodiments disclosed but includes modifications made within the true spirit and scope of the invention.

What is claimed is:

1. A process for the deposition of a crystalline vanadium dioxide thin film comprising:
   providing a solution comprising a vanadium tetraalkoxide and solvent;
   allowing hydrolysis and condensation reactions to progressively form a homogenous sol from the solution,
   applying a coating of the sol to the substrate;
   allowing a gel to form from the sol on the substrate by evaporating the solvent; dehydrating the gel by heat treatment under an inert atmosphere to form the crystalline vanadium dioxide film.

2. A process according to claim 1, wherein the vanadium tetraalkoxide is one of vanadium tetraisopropoxide and vanadium tetrais(t-butoxide).

3. A process according to claim 1, wherein the vanadium tetraalkoxide is vanadium tetrakis(t-butoxide) prepared according to the following process:
   dissolving vanadium tetrachloride in a solvent to form a solution;
   adding the solution dropwise to a suspension of a potassium tert-butoxide of eon of potassium, magnesium, lithium and sodium, in the solvent while stirring at below 0.° C. to form a reaction mixture;
   warming the reaction mixture to room temperature;
   filtering under an inert atmosphere to form a liquid comprising the solvent and vanadium tetrakis(t-butoxide);
   evaporating the solvent; and
   recovering the vanadium tetrakis(t-butoxide) by vacuum distillation.

4. A process according to claim 1, wherein the solvent is a polar solvent.

5. A process according to claim 4, wherein the solvent is alcohol.

6. A process according to claim 4, wherein the solvent is a parent alcohol to the vanadium tetraalkoxide.

7. A process according to claim 4, wherein the solvent is one of isopropanol and t-butanol.

8. A process according to claim 1, wherein the heat treatment comprises heating at 200-700° C. under an inert atmosphere.

9. A process according to claim 1, wherein the entire process is performed under an inert atmosphere.

10. A process according to claim 1, wherein the sol coating is applied by one of dip coating, spin coating and spraying.

11. A process according to claim 1, wherein the solution also comprises one of tungsten, molybdenum, tantalum, iron and chromium.

12. A process according to claim 1, wherein the solution also comprises at least one of a metal oxychloride, a metal alkoxide, a metal nitrate and a metal oxalate.

13. A process according to claim 1, wherein the solution also comprises one of tungsten (IV) oxytetrachloride, molybdenum (IV) oxytetrachloride, iron (III) nitrate and chromium (III) nitrate.

14. A process for the deposition of crystalline vanadium dioxide comprising:
   providing a solution comprising a vanadium tetraalkoxide and a solvent;
   allowing hydrolysis and condensation reactions to progressively form a homogeneous sol from the solution;
   dipping a substrate into the sol;
   withdrawing the substrate from the sol at a constant rate to form a coating of the sol on the substrate;
   allowing a gel to form for the sol on the substrate by evaporating the solvent;
   dehydrating the gel by heat treatment in an inert atmosphere to form the crystalline vanadium dioxide film.

15. A process according to claim 14, wherein the vanadium tetraalkoxide is one of vanadium tetraisopropoxide and vanadium tetrakis(t-butoxide).

16. A process according to claim 14, wherein the vanadium tetraalkoxide is vanadium tetrakis(t-butoxide) prepared according to the following process:
   dissolving vanadium tetrachloride in a solvent to form a solution;
   adding the solution dropwise to a suspension of a tertbutoxide of one of potassium, magnesium, lithium and sodium, in the while stirring at below 0° C. to form a reaction mixture;
   warming the reaction mixture to room temperature;
   filtering under nitrogen to form a green liquid comprising the solvent and vanadium tetrakis(t-butoxide);
   evaporating the solvent; and
   recovering the vanadium tetrakis(t-butoxide) by vacuum distillation.

17. A process according to claim 14, wherein the solvent is a polar solvent.

18. A process according to claim 17, wherein the solvent is alcohol.

19. A process according to claim 17, wherein the solvent is a parent alcohol to the vanadium tetraalkoxide.

20. A process according to claim 17, wherein the solvent is one of isopropanol and t-butanol.

21. A process according to claim 14, wherein the heat treatment comprises heating at 200-700° C. in an inert atmosphere.

22. A process according to claim 14, wherein all process steps occur under an inert atmosphere comprising one of nitrogen, argon and helium.

23. A process according to claim 14, wherein the solution also comprises one of tungsten, molybdenum, tantalum, iron and chromium ions.

24. A process according to claim 14, wherein the solution also comprises at least one of a metal oxychloride, a metal alkoxide, a metal nitrate and a metal oxalate.

25. A process according to claim 14, wherein the metal oxychloride is one of tungsten (IV) oxytetrachloride, molybdenum (IV) oxytetrachloride, iron III nitrate and chromium III nitrate.

26. A process according to claim 14, wherein the constant rate is approximately 1 mm/sec.

* * * * *